(12) United States Patent
Turkuz et al.

(10) Patent No.: US 12,202,765 B2
(45) Date of Patent: Jan. 21, 2025

(54) LOW-E COATING WHICH IS APPLICABLE TO LAMINATED AUTOMOTIVE GLASSES

(71) Applicant: TURKIYE SISE VE CAM FABRIKALARI ANONIM SIRKETI, Tuzla/Istanbul (TR)

(72) Inventors: Seniz Turkuz, Tuzla/Istanbul (TR); Ocal Tuna, Tuzla/Istanbul (TR); Alperen Sezgin, Tuzla/Istanbul (TR); Sinem Eraslan, Tuzla/Istanbul (TR); Erdem Arpat, Tuzla/Istanbul (TR); Tuncay Turutoglu, Tuzla/Istanbul (TR)

(73) Assignee: TURKIYE SISE VE CAM FABRIKALARI ANONIM SIRKETI, Istanbul (TR)

(*) Notice: Subject to any disclaimer, the term of this patent is extended or adjusted under 35 U.S.C. 154(b) by 903 days.

(21) Appl. No.: 17/299,620

(22) PCT Filed: Dec. 13, 2019

(86) PCT No.: PCT/TR2019/051072
§ 371 (c)(1),
(2) Date: Jun. 3, 2021

(87) PCT Pub. No.: WO2020/130981
PCT Pub. Date: Jun. 25, 2020

(65) Prior Publication Data
US 2022/0017409 A1    Jan. 20, 2022

(30) Foreign Application Priority Data
Dec. 18, 2018  (TR) .................... 2018/19739

(51) Int. Cl.
C03C 17/36    (2006.01)

(52) U.S. Cl.
CPC ........ *C03C 17/366* (2013.01); *C03C 17/3626* (2013.01); *C03C 17/3642* (2013.01); *C03C 17/3644* (2013.01); *C03C 17/3681* (2013.01); *C03C 2217/212* (2013.01);
(Continued)

(58) Field of Classification Search
None
See application file for complete search history.

(56) References Cited

U.S. PATENT DOCUMENTS

2014/0141259 A1    5/2014  Imran et al.
2015/0140354 A1    5/2015  Pallotta et al.

FOREIGN PATENT DOCUMENTS

| CN | 102795793 A | 11/2012 |
|---|---|---|
| DE | 102016114281 A1 * | 2/2018 |
| WO | 2015/014854 A2 | 2/2015 |

OTHER PUBLICATIONS

Translation—DE-102016114281-A1; Koeckert C; Koeckert C (Year: 2018).*

(Continued)

*Primary Examiner* — Humera N. Sheikh
*Assistant Examiner* — Elizabeth D Ivey
(74) *Attorney, Agent, or Firm* — Bayramoglu Law Offices LLC

(57) ABSTRACT

The present invention is related to a triple silver low-e coating and developed with electrically conductive and heatable characteristic in order to be used on the second or third surfaces of laminated automobile glasses.

4 Claims, 1 Drawing Sheet

(52) U.S. Cl.
CPC .................. *C03C 2217/213* (2013.01); *C03C 2217/228* (2013.01); *C03C 2217/281* (2013.01); *C03C 2218/154* (2013.01)

(56) References Cited

OTHER PUBLICATIONS

International Search Report and Written Opinion of the International Searching Authority for International Patent Application No. PCT/TR2019/051072 mailed Aug. 14, 2020, 10 pages.

* cited by examiner

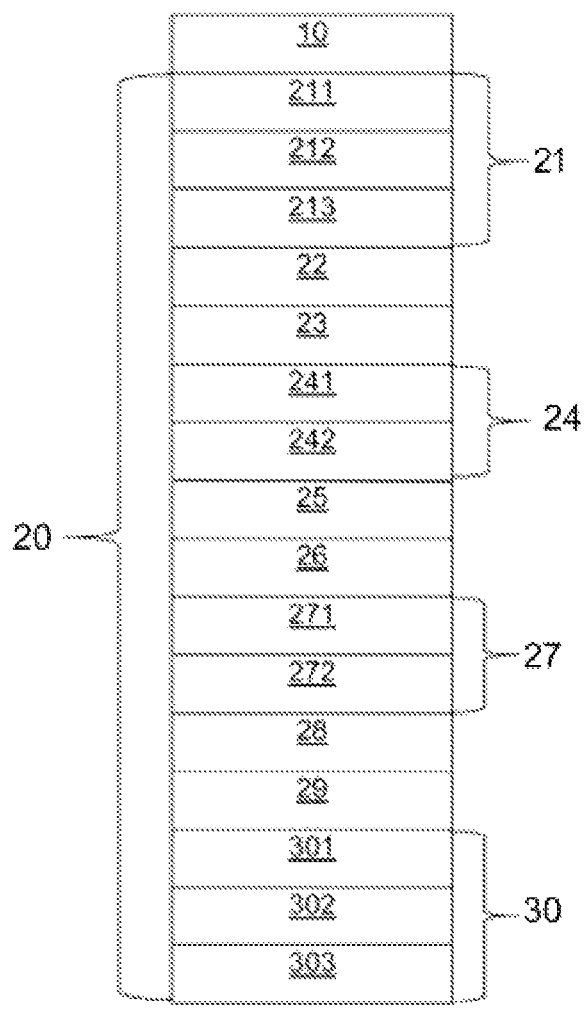

LOW-E COATING WHICH IS APPLICABLE TO LAMINATED AUTOMOTIVE GLASSES

CROSS-REFERENCE TO RELATED APPLICATIONS

This application is a National Stage Application of PCT/TR2019/051072, filed 13 Dec. 2019, which claims the benefit of Serial No. 2018/19739, filed 18-12-2018 in Turkey, and each of which applications are incorporated herein by reference. To the extent appropriate, a claim of priority is made to each of the above-disclosed applications.

TECHNICAL FIELD

The present invention is related to a triple silver low-e coating developed for being used on the second or third surface of automobile windshields where lamination process is to be realized.

PRIOR ART

One of the factors, which differentiate optical characteristics of glasses is the coating application applied on glass surfaces. Magnetron sputtering process is a well-known coating application which takes place in vacuum environment. This process is a frequently applied methodology in production of low-e coated glasses, used in architectural and automotive industries. By means of said method, the transmittance and reflectance of the coated glasses in the visible, near infrared and infrared region can be obtained at target levels.

Total solar energy transmittance (g) is also an important parameter in coated glasses which can be used in architectural and automotive sectors beside the visible region transmittance and reflectance. For lowering heating loads inside vehicles in cold climates and thus for providing fuel efficiency, high total solar transmittance (g) are preferred. The total solar energy transmittance (g) of the coatings can be kept at target levels by means of optimizations of coating parameters of the layers, the seed layer type used and the Ag layers included.

The patent with publication number CN102795793 relates to a laminated glass, particularly relates to a laminated glass having high thermal reflectivity applied to vehicle or construction field and having electrical heating function and more particularly relates to an automobile glass assembled onto a vehicle. Low-e coated laminated glass, described in the invention and which can be heated by electrical power, comprises a polymer compressed between two glass substrates and a low-e coating. In order to heat the low-e coated laminated glass heated by electrical power provided by the invention, it is used as data path together with ACF (anisotrophical conductive film) or PSA (adhesive which is susceptible to pressure) coating. Thus, diverging of the freezing and melting ice is facilitated.

BRIEF DESCRIPTION OF THE INVENTION

The present invention relates to a low-e coating applied on glass surface, for eliminating the above mentioned disadvantages and bringing new advantages to the related technical field.

An object of the present invention is to provide a low-e coating, which is thermally processable.

Another object of the present invention is to provide a low-e coating which can be used in laminated automotive glasses.

Another object of the present invention is to provide a low-e coating which is heatable.

Another object of the present invention is to provide a low-e coating with improved electrical conductivity.

Another object of the present invention is to provide a low-e coating, which coupled with head up display applications of automotive industry.

In order to realize the above mentioned objects and the objects which are to be deducted from the detailed description below, the present invention is a triple silver low-e coating and developed in heatable characteristic and which is electrically conductive in order to be used on the second or third surface of a laminated automobile glass. Accordingly, said invention is characterized in that Tvis value is between 64% and 78%, and the following is provided outwardly from the glass:

the first dielectric structure comprising at least one of $Si_xN_y$, $SiAlN_x$, $SiAlO_xN_y$, $SiO_xN_y$, $ZnSnO_x$, $TiO_x$, $TiN_x$, $ZrN_x$, NiCr, $NiCrO_x$, $TiO_x$, $ZnSnO_x$, $ZnAlO_x$, $ZnO_x$;

the first functional layer positioned on said first dielectric structure, a first barrier layer comprising at least one of NiCr, $NiCrO_x$, $TiO_x$, $ZnAlO_x$ and positioned on said first functional layer, the second dielectric structure comprising at least one of $Si_xN_y$, $SiAlN_x$, $SiAlO_xN_y$, $SiO_xN_y$, $ZnSnO_x$, $TiO_x$, $TiN_x$, $ZrN_x$, NiCr, $NiCrO_x$, $TiO_x$, $ZnSnO_x$, $ZnAlO_x$, $ZnO_x$ and positioned on said first barrier layer, the second functional layer positioned on said second dielectric structure, the second barrier layer comprising at least one of NiCr, $NiCrO_x$, $TiO_x$, $ZnAlO_x$ and positioned on said second functional layer, the third dielectric structure comprising at least one of $Si_xN_y$, $SiAlN_x$, $SiAlO_xN_y$, $SiO_xN_y$, $ZnSnO_x$, $TiO_x$, $TiN_x$, $ZrN_x$, NiCr, $NiCrO_x$, $TiO_x$, $ZnSnO_x$, $ZnAlO_x$, $ZnO_x$ and positioned on said second barrier layer, the third functional layer positioned on said third dielectric structure, the third barrier layer comprising at least one of NiCr, $NiCrO_x$, $TiO_x$, $ZnAlO_x$ and positioned on said third functional layer, the upper dielectric structure comprising at least one of or a number of $Si_xN_y$, $SiAlN_x$, $SiAlO_xN_y$, $SiO_x$, $SiO_xN_y$, $ZnSnO_x$, $ZnAlO_x$, $TiO_x$, $TiN_x$, $ZrN_x$ layers and positioned on said third barrier layer.

In a preferred embodiment of the present invention, the first dielectric structure comprises a first dielectric layer which contacts the glass and which comprises at least one of $Si_xN_y$, $SiAlN_x$, $SiAlO_xN_y$, $SiO_xN_y$, $ZnSnO_x$, $TiO_x$, $TiN_x$, $ZrN_x$.

In another preferred embodiment of the present invention, the first dielectric structure comprises a second dielectric layer comprising at least one of $Si_xN_y$, $SiAlN_x$, $SiAlO_xN_y$, $SiO_xN_y$, $ZnSnO_x$, $TiO_x$, $TiN_x$, $ZrN_x$.

In another preferred embodiment of the present invention, at least one of the first dielectric structure, the second dielectric structure and the third dielectric structure comprises a seed layer comprising at least one of NiCr, $NiCrO_x$, $TiO_x$, $ZnSnO_x$, $ZnAlO_x$, $ZnO_x$.

In a preferred embodiment of the present invention, said seed layer is at least in contact with one of the first functional layer, the second functional layer and the third functional layer.

In another preferred embodiment of the present invention, said seed layers are provided in pluralities of numbers and they contact each of the first functional layer, the second functional layer and the third functional layer.

In another preferred embodiment of the present invention, each of the seed layers which contact the first functional layer, the second functional layer and the third functional layer comprises the same materials.

In a preferred embodiment of the present invention, each of the first barrier layer, the second barrier layer and the third barrier layer is made of the same material and in substoichiometric oxide form.

In another preferred embodiment of the present invention, the second dielectric structure, the third dielectric structure and the upper dielectric structure comprise at least one dielectric layer in oxide form.

In another preferred embodiment of the present invention, the upper dielectric structure comprises at least three dielectric layers in oxide form.

In another preferred embodiment of the present invention, the following is respectively provided outwardly from the glass:
the thickness of the first dielectric layer is between 8 nm and 23 nm;
the thickness of the second dielectric layer is between 2 nm and 11 nm;
the thickness of the first seed layer is between 11 nm and 29 nm;
the thickness of the first functional layer is between 5 nm and 22 nm;
the thickness of the first barrier layer is between 0.8 nm and 2.2 nm;
the thickness of the third dielectric layer is between 40 nm and 70 nm;
the thickness of the second seed layer is between 8 nm and 24 nm;
the thickness of the second functional layer is between 5 nm and 22 nm;
the thickness of the second barrier layer is between 0.8 nm and 2.2 nm;
the thickness of the fourth dielectric layer is between 35 nm and 65 nm;
the thickness of the third seed layer is between 10 nm and 35 nm;
the thickness of the third functional layer is between 5 nm and 22 nm;
the thickness of the third barrier layer is between 0.8 nm and 2.2 nm;
the thickness of the fifth dielectric layer is between 10 nm and 35 nm;
the thickness of the sixth dielectric layer is between 10 nm and 35 nm;
the thickness of the upper dielectric layer is between 5 nm and 35 nm.

In another preferred embodiment of the present invention, the following layers are provided outwardly from the glass: $Si_xN_y/TiO_x/ZnAlO_x/Ag/NiCrO_x/ZnSnO_x/ZnAlO_x/Ag/NiCrO_x/ZnSnO_x/ZnAlO_x/Ag/NiCrO_x/ZnSnO_x/SiO_xN_y/SiO_x$.

In another preferred embodiment of the present invention, in case the low-e coating is used on the third surface, the outside reflectance a* value is between −10 and −4 and the outside reflectance b* value is between −6 and −1.

In another preferred embodiment of the present invention, when used on the second and third surfaces, the outside reflectance a* value remains in the negative region at incidence angles between 0° and 75°.

BRIEF DESCRIPTION OF THE FIGURES

FIG. 1 is a representative view of the low-e coated glass.

REFERENCE NUMBERS

10 Glass
20 Low-e coating
21 First dielectric structure
211 First dielectric layer
212 Second dielectric layer
213 Seed layer
22 First functional layer
23 First barrier layer
24 Second dielectric structure
241 Third dielectric layer
242 Second seed layer
25 Second functional layer
26 Second barrier layer
27 Third dielectric structure
271 Fourth dielectric layer
272 Third seed layer
28 Third functional layer
29 Third barrier layer
30 Upper dielectric structure
301 Fifth dielectric layer
302 Sixth dielectric layer
303 Upper dielectric layer

DETAILED DESCRIPTION OF THE INVENTION

In this detailed description, the subject matter low-e coated (20) glass (10) is explained with references to examples without forming any restrictive effect only in order to make the subject more understandable.

Production of low-e coated (20) glasses (10) related to architectural and automotive sector is realized by means of sputtering technique under vacuum medium. The present invention essentially relates to triple silver low-e coated (20) glasses (10) and having high thermal process resistance and which can be laminated and heated and used as thermal insulation glass (10) and which transmits daylight, the ingredient of said low-e coating (20) and the application thereof.

In the present invention, a low-e coating (20) has been developed which is formed by several metal, metal oxide and metal nitride/oxy-nitride layers positioned on glass (10) surface by using sputtering method for obtaining a low-e coated (20) glass (10) designed such that the angular color change thereof is at acceptable level and which can be laminated and which can be thermally processed and which has high level of visible light transmittance in order to be applied onto the surface of glass (10). Said layers are accummulated on each other respectively in vacuum environment. As the thermal process, at least one and/or a number of tempering, partial tempering, annealing and bending processes can be used together. The subject matter low-e coated (20) glass (10) can be used as architectural and automotive glass (10).

As a result of experimental studies for developing a low-e coating (20) arrangement which is preferred in terms of production easiness and in terms of optical characteristics, the following data has been detected.

In the subject matter low-e coated (20) glass (10), the refraction indexes of all layers have been determined by using calculated methods through optical constants obtained from single-layer measurements. Said refraction indexes are the refraction index data measured at 550 nm.

In the subject matter low-e coating (20), there is a first functional layer (22), a second functional layer (25) and a third functional layer (28) which transmit the visible region at the targeted level and which provides reflection (lower transmission) of thermal radiation in the infrared spectrum. The first functional layer (22), the second functional layer (25) and the third functional layer (28) comprise Ag and their thermal radiation is low. In order to reach the targeted performance value, the thickness of the first functional layer (22), the second functional layer (25) and the third functional layer (28) is substantially important. In the preferred application, the thickness of the first functional layer (22), the second functional layer (25) and the third functional layer (28), comprising Ag, is between 5 nm and 22 nm. In a further preferred application, the thickness of the first functional layer (22), the second functional layer (25) and the third functional layer (28), comprising Ag, is between 8 nm and 19 nm. In the most preferred application, the thickness of the first functional layer (22), the second functional layer (25) and the third functional layer (28), comprising Ag, is between 11 nm and 17 nm.

In the subject matter coated glass, there is a first dielectric structure (21) positioned between the glass (10) and the first functional layer (22) in a manner contacting the first functional layer (22). Said first dielectric structure (21) comprises at least one dielectric layer and at least one seed layer (213). Preferably, the first dielectric structure (21) comprises a first dielectric layer (211) and a second dielectric layer (212) and a first seed layer (213). Said first dielectric layer (211) and said second dielectric layer (212) comprise at least one of or a number of $Si_xN_y$, $SiAlN_x$, $SiAlO_xN_y$, $SiO_xN_y$, $ZnSnO_x$, $TiO_x$, $TiN_x$, $ZrN_x$ layers.

In the preferred application, a layer comprising $Si_xN_y$ is used as the first dielectric layer (211). The first dielectric layer (211) comprising $Si_xN_y$ behaves like diffusion barrier and serves to prevent alkali ion migration which is facilitated at high temperature. Thus, the first dielectric layer (211) comprising $Si_xN_y$ supports the resistance of the low-e coating (20) to the thermal processes. The change interval for the refraction index of the first dielectric layer (211) comprising $Si_xN_y$ is between 2.00 and 2.10. In the preferred structure, the change interval for the refraction index of the first dielectric layer (211) comprising $Si_xN_y$ is between 2.02 and 2.07.

The thickness of the first dielectric layer (211) comprising $Si_xN_y$ is between 8 nm and 23 nm. In the preferred application, the thickness of the first dielectric layer (211) comprising $Si_xN_y$ is between 10 nm and 21 nm. In a further preferred application, the thickness of the first dielectric layer (211) comprising $Si_xN_y$ is between 12 nm and 19 nm.

At least one first seed layer (213) is positioned between the first dielectric layer (211) comprising $Si_xN_y$ and the Ag layer which is the first functional layer (22). In an application of the present invention, the first seed layer (213) directly contacts the first dielectric layer (211) which comprises $Si_xN_y$. The first seed layer (213) comprises at least one of NiCr, $NiCrO_x$, $TiO_x$, $ZnSnO_x$, $ZnAlO_x$, $ZnO_x$. In the preferred application, the first seed layer (213) comprises $ZnAlO_x$. The thickness of the first seed layer (213) is between 11 nm and 29 nm. In the preferred application, the thickness of the first seed layer (213) is between 14 nm and 26 nm. In a further preferred application, the thickness of the first seed layer (213) is between 17 nm and 23 nm.

In another application of the present invention, a second dielectric layer (212) is positioned between the first seed layer (213) and the first dielectric layer (211) comprising $Si_xN_y$. Said second dielectric layer (212) comprises at least one of $TiO_x$, $ZrO_x$, $NbO_x$ layers. In the preferred application, $TiO_x$ is used as the second dielectric layer (212). The refraction index of $TiO_x$ layer is between 2.40 and 2.60. In the preferred application, the refraction index of $TiO_x$ layer is between 2.40 and 2.55. The thickness of the $TiO_x$ layer which is the second dielectric layer (212) is between 2 nm and 11 nm. In the preferred application, the thickness of the $TiO_x$ layer is between 3 nm and 10 nm. In a further preferred application, the thickness of the $TiO_x$ layer is between 5 nm and 8 nm.

There is a first barrier layer (23) positioned on the first functional layer (22) comprising Ag in a manner contacting said first functional layer (22), there is a second barrier layer (26) positioned on the second functional layer (25) in a manner contacting said second functional layer (25), and there is a third barrier layer (29) positioned on the third functional layer (28) in a manner contacting said third functional layer (28). The first barrier layer (23), the second barrier layer (26) and the third barrier layer (29) comprises at least one of NiCr, $NiCrO_x$, $TiO_x$, $ZnAlO_x$ materials. In the preferred application, $NiCrO_x$ is used as the first barrier layer (23), the second barrier layer (26) and the third barrier layer (29). The thicknesses of the first barrier layer (23), the second barrier layer (26) and the third barrier layer (29) comprising $NiCrO_x$ is between 0.8 nm and 2.2 nm. In the preferred application, the thicknesses of the first barrier layer (23), the second barrier layer (26) and the third barrier layer (28) comprising $NiCrO_x$ is between 0.8 nm and 2.0 nm. In the preferred application, the thicknesses of the first barrier layer (23), the second barrier layer (26) and the third barrier layer (28) comprising $NiCrO_x$ is between 1.0 nm and 1.8 nm. In an application of the present invention, the thicknesses of the second barrier layer (26) and the third barrier layer (28) are equal to each other.

The second dielectric structure (24) is positioned between the first functional layer (22) and the second functional layer (25), and the third dielectric structure (27) is positioned between the second functional layer (25) and the third functional layer (28). Each of the second dielectric structure (24) and the third dielectric structure (27) comprises at least one dielectric layer comprising at least one of $Si_xN_y$, $SiAlN_x$, $SiAlO_xN_y$, $SiO_xN_y$, $ZnSnO_x$, $TiO_x$, $TiN_x$, $ZrN_x$ layers, and at least one seed layer comprising at least one of NiCr, $NiCrO_x$, $TiO_x$, $ZnSnO_x$, $ZnAlO_x$, $ZnO_x$.

The second dielectric structure (24) comprises a third dielectric layer (241) and a second seed layer (242). The third dielectric layer (241) preferably comprises $ZnSnO_x$. The thickness of the third dielectric layer (241) comprising $ZnSnO_x$ is between 40 nm and 70 nm. In the preferred application, the thickness of the third dielectric layer (241) comprising $ZnSnO_x$ is between 45 nm and 65 nm. In a further preferred application, the thickness of the third dielectric layer (241) comprising $ZnSnO_x$ is between 50 nm and 60 nm. The change interval for the refraction index of the third dielectric layer (241) comprising $ZnSnO_x$ is between 2.00 and 2.12. In the preferred structure, the change interval for the refraction index of the third dielectric layer (241) comprising $ZnSnO_x$ is between 2.03 and 2.09. The second seed layer (242) preferably comprises $ZnAlO_x$. The thickness of the second seed layer (242) comprising $ZnAlO_x$ is between 8 nm and 23 nm. In the preferred application, the thickness of the second seed layer (242) comprising $ZnAlO_x$ is between 10 nm and 21 nm. In a further preferred application, the thickness of the second seed layer (242) comprising $ZnAlO_x$ is between 13 nm and 19 nm.

The third dielectric structure (27) comprises a fourth dielectric layer (271) and a third seed layer (272). The fourth dielectric layer (271) preferably comprises $ZnSnO_x$. The thickness of the fourth dielectric layer (271) comprising $ZnSnO_x$ is between 45 nm and 75 nm. In the preferred application, the thickness of the fourth dielectric layer (271) comprising $ZnSnO_x$ is between 50 nm and 70 nm. In a further preferred application, the thickness of the fourth dielectric layer (271) comprising $ZnSnO_x$ is between 55 nm and 65 nm. The change interval for the refraction index of the fourth dielectric layer (271) comprising $ZnSnO_x$ is between 2.00 and 2.12. In the preferred structure, the change interval for the refraction index of the fourth dielectric layer (271) comprising $ZnSnO_x$ is between 2.03 and 2.09. The third seed layer (272) preferably comprises $ZnAlO_x$. The thickness of the third seed layer (272) comprising $ZnAlO_x$ is between 10 nm and 35 nm. In the preferred application, the thickness of the third seed layer (272) comprising $ZnAlO_x$ is between 15 nm and 30 nm. In the further preferred application, the thickness of the third seed layer (272) comprising $ZnAlO_x$ is between 18 nm and 25 nm.

There is an upper dielectric structure (30) on the third barrier layer (29). Said dielectric structure (30) comprises at least one dielectric layer comprising at least one or a number of $Si_xN_y$, $SiAlN_x$, $SiAlO_xN_y$, $SiO_x$, $SiO_xN_y$, $ZnSnO_x$, $ZnAlO_x$, $TiO_x$, $TiN_x$, $ZrN_x$ layers. The upper dielectric structure (30) preferably comprises a fifth dielectric layer (301); a sixth dielectric layer (302) accummulated on said fifth dielectric layer (301); and optionally an upper dielectric layer (303) which contacts the outer medium.

The fifth dielectric layer (301) preferably comprises $ZnSnO_x$. The thickness of the fifth dielectric layer (301) comprising $ZnSnO_x$ is between 10 nm and 35 nm. In the preferred application, the thickness of the fifth dielectric layer (301) comprising $ZnSnO_x$ is between 15 nm and 30 nm. In a further preferred application, the thickness of the fifth dielectric layer (301) comprising $ZnSnO_x$ is between 18 nm and 26 nm.

The sixth dielectric layer (302) preferably comprises at least one of $SiO_xN_y$ or SiN. Preferably the thickness of the sixth dielectric layer (302) comprising $SiO_xN_y$ is between 10 nm and 35 nm. In the preferred application, the thickness of the sixth dielectric layer (302) comprising $SiO_xN_y$ is between 14 nm and 28 nm. In the further preferred application, the thickness of the sixth dielectric layer (302) comprising $SiO_xN_y$ is between 16 nm and 23 nm.

The upper dielectric layer (303) preferably comprises $SiO_x$. The thickness of the upper dielectric layer (303) comprising $SiO_x$ is between 5 nm and 35 nm. In the preferred application, thickness of the upper dielectric layer (303) comprising $SiO_x$ is between 10 nm and 30 nm. In the further preferred application, thickness of the upper dielectric layer (303) comprising $SiO_x$ is between 13 nm and 20 nm.

The characteristics of the uppermost dielectric layer (302) of the low-e coating (20) are substantially important for the storage lifetime, thermal processability, resistance and visual aesthetics of the low-e coated (20) glass (10) since said characteristics determine the character of the coated glass (10) during thermal process.

Since resistance to scratching is important particularly in automotive sector, the material and characteristics of the final layer(s) bear importance. The following studies have been realized in order to determine the upper dielectric structure (30) which is compliant to the layers, existing before, and which has ideal scratching resistance without deteriorating the optical characteristics of glass.

Example 1

Glass/ . . . /upper dielectric structure (30)
Glass/ . . . /fifth dielectric layer (301)/sixth dielectric layer (302)

In Example 1, it has been observed that the residual stress value measured before the thermal process is −1040 MPa and the residual stress value measured after the thermal process is −1065 MPa as a result of coating $ZnSnO_x$ with thickness of 25 nm obtained at a pressure of $2.20 \times 10^{-3}$ mbar as the fifth dielectric layer (301) onto glass and coating SixNy with thickness of 31 nm obtained at a pressure of $3.25 \times 10^{-3}$ mbar as the sixth dielectric layer (302) onto glass. In order to determine the scratch resistance of the coating obtained at the given stress values, increasing load was applied and flaking has been observed in the coating at the beginning steps of the test. Besides, it has also been observed that the coating was delaminated as a result of the increasing load applied to the coating, and the critical load value has been measured to be 13.42 mN.

Example 2

Glass/ . . . /upper dielectric structure (30)
Glass/ . . . /fifth dielectric layer (301)/sixth dielectric layer (302)

In Example 2, it has been observed that the residual stress value measured before the thermal process is −1032 MPa and the residual stressvalue measured after the thermal process is −1021 MPa as a result of coating $ZnSnO_x$ with thickness of 25 nm obtained at a pressure of $2.20 \times 10^{-3}$ mbar as the fifth dielectric layer (301) onto glass and coating $Si_xN_y$ with thickness of 31 nm obtained at a pressure of $4.60 \times 10^{-3}$ mbar as the sixth dielectric layer (302) onto glass. As the $Si_xN_y$ coating pressure is increased, a significant decrease has not been observed in the residual stress values. Thus, flaking, which occurs due to increasing load, has not been prevented. Besides, it has also been observed that the coating delaminated as a result of the increasing load applied to the coating, and the critical load value has been measured to be 12.45 mN.

Example 3

Glass/ . . . /upper dielectric structure (30)
Glass/ . . . /fifth dielectric layer (301)/sixth dielectric layer (302)/upper dielectric layer (303)

In Example 3, it has been observed that the residual stress value measured before the thermal process is −669 MPa and the residual stressvalue measured after the thermal process is −580 MPa as a result of coating $ZnSnO_x$ with thickness of 25 nm obtained at a pressure of $2.20 \times 10^{-3}$ mbar as the fifth dielectric layer (301) onto glass and coating $SiO_xN_y$ with thickness of 21 nm obtained at a pressure of $4.58 \times 10^{-3}$ mbar as the sixth dielectric layer (302) onto glass and optionally coating $SiO_x$ with thickness of 15 nm obtained at a pressure of $2.22 \times 10^{-3}$ mbar as the upper dielectric layer (303) onto glass. Besides, it has also been observed that the coating has been delaminated as a result of the increasing load applied, and the critical load value has been measured to be 21.76 mN. In the structure obtained by means of Example 3, flaking, which occurs due to increasing load, has been observed in case of greater loads and more rarely when compared with Example 1 and Example 2. Thus, the scratching resistance of the structure obtained by means of Example 3 has been measured to be higher when compared to others.

According to the obtained measurement results, the Glass/ . . . /ZnSnO$_x$/SiO$_x$N$_y$/SiO$_2$ structure given in Example 3 has a lower residual stress value when compared with Glass/ . . . /ZnSnO$_x$/Si$_x$N$_y$ structure and it shows higher performance in terms of scratching resistance.

High performance in terms of scratching resistance is particularly important for preventing the problems resulting from scratching in the production processes of head up display applications, which needs precise geometric tolerances especially in coated automotive glasses. The subject matter low-e coating can be processed by means of processes like different press and press-supported sag bending during production of glasses which are compliant to said head up display.

The surface resistance of the low-e coating (20) in the above mentioned arrangement after thermal process is between 0.7Ω/square and 1.0Ω/square. In the preferred application, the surface resistance of the low-e coating (20) is between 0.8Ω/square and 0.9Ω/square after thermal process. The laminated glass (10), where the subject matter low-e coating (20) is applied and which has said surface resistance levels, can be heated for eliminating ice and mist by means of accummulator output voltages of 12 V-14 V used in automobiles of today without needing any other voltage regulator device.

The subject matter low-e coating (20) can also be used in laminated glass (10) embodiments. In lamination applications, the surface numbering is arranged from outside towards inside. For instance, the second surface describes the part of the glass (10), facing the outer medium, which faces the laminated surface. The third surface describes the part of the glass (10), which faces the inner part of the building or vehicle, which faces the laminated surface. In lamination application, said low-e coating (20) can be preferably used on the second or third surface.

The thicknesses of the used glass change between 0.1 mm and 12 mm. In case it is used in motorized vehicle glasses (10), the glass thickness is between 1 mm and 4 mm. The thicknesses of the glasses used in architectural application are between 4 mm and 12 mm.

In case the subject matter low-e coating (20) is used on the third surface of laminated glass (10) in motorized vehicle applications, Tvis value among the optical performance values is between 64% and 78%. In case the subject matter low-e coating (20) is used on the third surface of laminated glass (10) in motorized vehicle applications, Tvis value is preferably between 66% and 76%. In case the subject matter low-e coating (20) is used on the third surface of laminated glass (10) in motorized vehicle applications, Tvis value is most preferably between 68% and 74%.

In case said low-e coating (20) is used on the third surface in motorized vehicle applications, the outside reflection a* value is between −10 and −4 and the outside reflection b* value is between −6 and −1. Independent of whether the low-e coating (20) is used on the second or on the third surface of laminated glass (10) in motorized vehicle applications, the external reflection a* value remains in the negative region at incidence angles between 0° and 75°.

In the low-e coating (20) structure, the proportions and the color values of all functional layers positioned between the dielectrics are important particularly for keeping the outside reflection a* value in the negative region. The values determined for the thickness ratio of the first functional layer (22)/the second functional layer (25)/the third functional layer (28) are 1.00±0.01/1.09±0.01/1.12±0.01. Thus, the outside reflection a* value provides the angular behaviour mentioned above.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. An electrically conductive triple silver low-e coating having a heatable characteristic for use as the second or third surfaces of laminated automobile glasses, comprising the following provided outwardly from the glass:
   a first dielectric layer comprising Si$_x$N$_y$ and having a thickness between 12 nm and 19 nm;
   a second dielectric layer comprising TiO$_x$ and having a thickness between 5 nm and 8 nm;
   a first seed layer comprising ZnAlO$_x$ and having a thickness between 17 nm and 23 nm;
   a first functional layer comprising Ag and having a thickness between 11 nm and 17 nm;
   a first barrier layer comprising NiCrO$_x$ and having a thickness between 1.0 nm and 1.8 nm;
   a third dielectric layer comprising ZnSnO$_x$ and having a thickness between 50 nm and 60 nm;
   a second seed layer comprising ZnAlO$_x$ and having a thickness between 13 nm and 19 nm;
   a second functional layer comprising Ag and having a thickness between 11 nm and 17 nm;
   a second barrier layer comprising NiCrO$_x$ and having a thickness between 1.0 nm and 1.8 nm;
   a fourth dielectric layer comprising ZnSnO$_x$ and having a thickness between 55 nm and 65 nm;
   a third seed layer comprising ZnAlO$_x$ and having a thickness between 18 nm and 25 nm;
   a third functional layer comprising Ag and having a thickness between 11 nm and 17 nm;
   a third barrier layer comprising NiCrO$_x$ and having a thickness between 1.0 nm and 1.8 nm;
   a fifth dielectric layer comprising ZnSnO$_x$ and having a thickness between 18 nm and 26 nm;
   a sixth dielectric layer comprising SiO$_x$N$_y$ and having a thickness between 16 nm and 23 nm;
   a top dielectric layer comprising SiO$_x$ and having a thickness between 13 nm and 20 nm;
   wherein the low-e coating provides a T$_{vis}$ is value between 64% and 78% when applied within a laminated glass.

2. The low-e coating according to claim 1, wherein each of the first barrier layer, the second barrier layer and the third barrier layer is made of the same material and in sub stoichiometric oxide form.

3. The low-e coating according to claim 1, wherein in case the low-e coated glass is used on the third surface, the outside reflection a* value is between −10 and −4 and the outside reflection b* value is between −6 and −1.

4. The low-e coating according to claim 1, wherein when used on the second and third faces, the outside reflection a* value remains in the negative region at incidence angles between 0° and 75°.

* * * * *